June 24, 1924.

F. C. KAUFMANN

TIRE FOR AUTOMOBILES

Filed Feb. 16, 1923

1,498,970

Inventor
FREDERICK C. KAUFMANN.

By his Attorney

Patented June 24, 1924.

1,498,970

UNITED STATES PATENT OFFICE.

FREDERICK C. KAUFMANN, OF NEW YORK, N. Y.

TIRE FOR AUTOMOBILES.

Application filed February 16, 1923. Serial No. 619,353.

*To all whom it may concern:*

Be it known that I, FREDERICK C. KAUFMANN, a citizen of the United States, and a resident of New York city, in the county of New York and State of New York, have invented certain new and useful Improvements in Tires for Automobiles, of which the following is a full, clear, and exact description.

The present invention relates to automobile tires of the solid or non-inflated type, and more particularly to tires of the type set forth in an application for patent for improvement in automobile tires, filed by me the 18th day of December, 1922, which application has been assigned the Serial No. 607,520.

One of the objects which the invention has in view is to provide a tire having a progressive resistance to the compression of its resilient member. Other objects of the invention are: to lighten the construction of the resilient member and housing therefor; to furnish a wearing member for the tire which may be replaced or removed; and to promote the radiation of heat from the tire.

Drawings.

Figure 1:
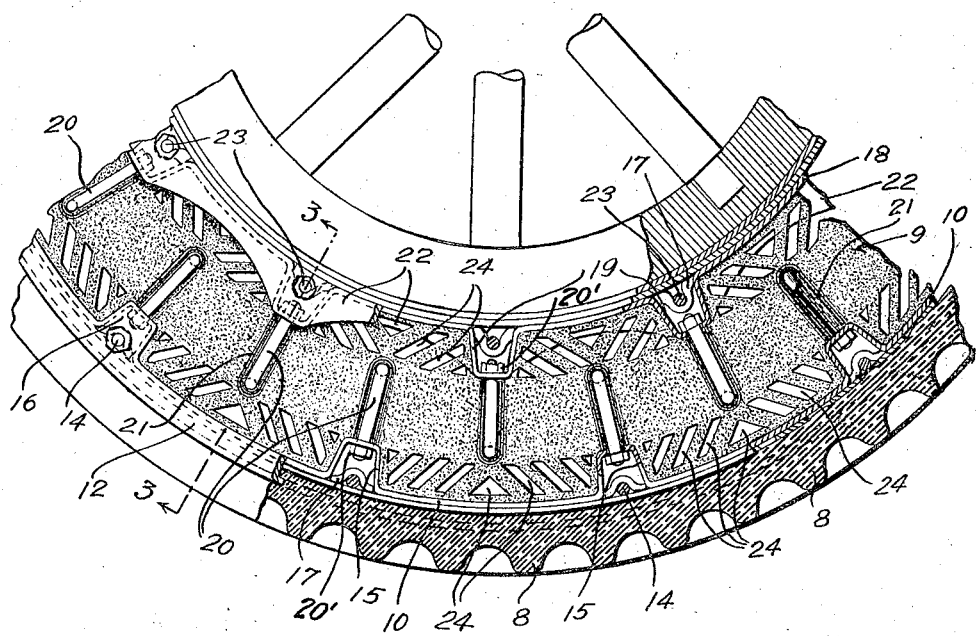
Figure 1 is a side view of a fragment of a wheel showing in conjunction therewith a fragment of a wheel tire constructed and arranged in accordance with the present invention, a portion of the Figure being cut away in section to show the interior construction of the tire.

Description.

As seen in the drawings, a tire constructed and arranged in accordance with the present construction has a wearing shoe 8 and a filler 9. The filler 9 may be secured in service independently of the shoe. That is to say, the shoe 8 may be renewed or repaired, and for this purpose be removed from the wheel, and separated from the filler 9 without disturbing the service disposition of the said filler 9. To this end the filler 9 has a light metal outer rim 10, while the shoe 8 is permanently mounted or held on an inner rim 11.

Figure 3:
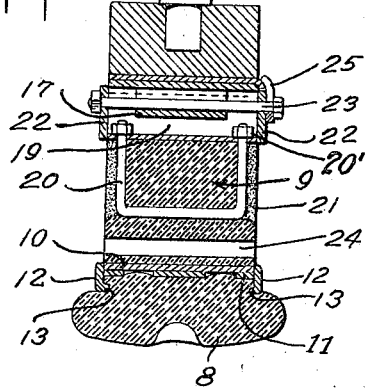
Figure 3 is a cross section, the section being taken as on the line 3—3 in Figure 1.
Figure 2:
Figure 2 is a detail view showing the side and end of a bolt cover or guide employed in the present construction.

In service the two rims are bound together by guide rings 12, the guide rings 12, as seen best in Figure 3 of the drawings, having each inturned flanges 13, which engage annular grooves in the shoe 8. The rims 12 are drawn into service position by bolts 14, which in service pass through housings or arches 15 formed in the rim 10. The arches 15 are covered by extensions 16, provided on the rings 12. The bolts 14 pass through the extensions 16 and receive upon their exposed ends suitable securing nuts, as shown in Figure 1 of the drawings. To hold the bolts 14 in fixed position within the arches 15, the housing clips 17 are furnished.

As seen best in Figure 1 of the drawings, the side edges of the clips 17 rest firmly against the sides of the arches 15 while crowding firmly on the bolt 14 with which it is associated. It will be seen from this construction that the pull on the shoe 8 provided the same be used on one of the driving wheels of a motor vehicle, will not succeed in moving the shoe on the rim 10.

As indicated in Figure 3 of the drawings, the rim 11 has at intervals recesses or openings therein, through which the material of the shoes 8 protrudes.

In practice the shoes 8 are mounted permanently on the rims 11, ready for adjustment into service on the filler 9 and the rim 10 thereof.

The filler 9 is somewhat permanently mounted on the felly of the wheel with which it is associated. To this end the filler is provided with an inner rim 18. The rim 18 has a series of arches 19 which resemble the arches 15 of the rim 10. The arches 19 and the arches 15 are disposed in service in staggered position. The arches extend toward the center of the filler 9 and become anchors for holding the said rims to the filler, and to receive the ends of staple bolts 20, which are secured in position by means of fastening nuts 20', as may be best seen in Figure 3 of the drawings. The filler 9, as is also most clearly shown in said Figure 3, has recesses or grooves 21, molded in the side of the filler, the said grooves being at opposite sides of the said filler and connected by a passage or piercing through which the arch or staple bolts 20 are passed.

As seen in Figure 1 of the drawings, the staple bolts 20 are alternately reversed in their extension and engagement. By this arrangement it is to be seen that one set of bolts 20 engage the arches 15, while a second set of staples 20 engage the arches 19 and also that the said staples are staggered.

The rim 18 is held rigidly in service relation to the felly of the wheel by guide rings 22. The guide rings 22 are united in service by bolts 23. The bolts 23 are held in clips 17 as are the bolts 14, previously described. The clips 17 in this relation function and perform the same service as described with relation to the bolts 14.

The heat generated by the friction of the road bed, when transmitted to the filler 9, is dissipated in part by the passages 24, which extend from side to side of the filler at both inner and outer edges. The passages 24, when yielding in action, eject the heated air and take in the cooled air, thereby promoting a circulation of the air at these areas to prevent accumulation of the heat incident to the travel of the wheel.

The weakened structure of the filler 9 at the inner and outer edges, caused by forming the passages 24 therein, also lessens the resistance of the filler with the result that the riding quality of the tire is improved by increasing the cushioning effect thereof. A series of clips 25 at one side of the tire, which are engaged by the bolt 23 as shown best in Figure 3 of the drawings, serve to prevent the loosening of the tire on the felly of the wheel or the release thereof from engagement with the said felly.

Claims.

1. In a cushion tire, spaced inner and outer concentric rims, an annular resilient filler between said rims, a plurality of extensions extending from said rims radially of the filler and embedded in the filler and spaced circumferentially of the rims with the extensions of one rim positioned in staggered relation to the projections of the other rim, and anchoring elements embedded in the filler and having portions extending radially thereof and rigidly connected with said extensions.

2. A tire comprising a plurality of rigid concentric rims disposed in spaced relation; a resilient cushion member disposed between said rims; a plurality of radial extensions extending from said rims into the cushioning member with the extensions of one rim positioned in staggered relation to the extensions of the other rim and said extension being embedded in said resilient member; and means for permanently connecting said extensions and said resilient member, said means embodying a series of staple bolts extending transversely through the resilient member and having their arms extending along the sides thereof and rigidly connected to said extensions.

3. In a cushion tire, concentric rims and annular filler of resilient material positioned between said rims and having its peripheral faces engaged thereby, open U-shaped arches extending radially from said rims and embedded in said filler, U-shaped bolts extending transversely through said filler and having their arms extending radially of said filler at opposite sides thereof and through openings in said arches, and fasteners in said arches engaged with said arms to firmly connect the anchor bolts with the arches.

4. In a cushion tire, concentric rims, an annular filler of resilient material positioned between said rims and having its peripheral faces engaged thereby, open U-shaped lugs extending radially from said rims and embedded in said filler, anchor bolts embedded in said filler and connected with said lugs, rims concentric with and fitting in close peripheral contacts with the first mentioned rims, removable side flanges for the second mentioned rims having extensions forming end walls for said open lugs, and fastener bolts for said side flanges passing through said lugs.

5. The structure of claim 4, and clips carried by the second mentioned rims within the lugs and straddling the flange securing bolts and having their side edge portions engaging the side walls of said lugs to hold the filler and first mentioned rims against annular creeping movement.

6. In a cushion tire, spaced concentric rims, an annular filler of elastic material positioned between said rims, said filler having a solid intermediate portion and having its peripheral portions provided with transversely extending passages forming webs each extending diagonally of and in crossed relation to a radius of the filler.

7. The structure of claim 6 having the webs arranged in groups with the webs of the groups positioned close together and the webs of each group extending in converging relation to the webs of adjoining groups.

8. In a cushion tire, spaced concentric rims an annular filler of elastic material between said rims, anchors embedded in the filler and extending radially thereof and connected with said rims, the anchors connected with one rim being in staggered relation to the anchors engaging the other rim, the filler having solid intermediate portion and having its peripheral portions provided with transversely extending passages providing openings positioned radially opposite said anchors and groups of webs between the said openings extending diagonally of the filler with each web in crossed relation to a radius of the filler.

FREDERICK C. KAUFMANN.